(12) United States Patent
Choi

(10) Patent No.: US 9,864,123 B2
(45) Date of Patent: Jan. 9, 2018

(54) BACKLIGHT UNIT

(75) Inventor: Jungki Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 591 days.

(21) Appl. No.: 13/450,255

(22) Filed: Apr. 18, 2012

(65) Prior Publication Data

US 2013/0039091 A1 Feb. 14, 2013

(30) Foreign Application Priority Data

Aug. 10, 2011 (KR) .......................... 10-2011-0079742

(51) Int. Cl.
*G02B 6/00* (2006.01)
*F21V 8/00* (2006.01)

(52) U.S. Cl.
CPC .......... *G02B 6/0021* (2013.01); *G02B 6/0068* (2013.01); *G02B 6/0073* (2013.01); *G02B 6/0083* (2013.01)

(58) Field of Classification Search
CPC .. G02B 6/0073; G02B 6/0091; G02B 6/0068; G02B 6/0021
USPC ........ 362/607, 612–613, 615, 620, 623–625, 362/627–628, 24, 246
See application file for complete search history.

(56) References Cited

U.S. PATENT DOCUMENTS

| | | | |
|---|---|---|---|
| 2006/0002146 A1* | 1/2006 | Baba | G02B 6/0021 362/613 |
| 2009/0207339 A1* | 8/2009 | Ajichi | G02B 5/0242 349/64 |
| 2010/0232138 A1 | 9/2010 | Tsai | |
| 2011/0007238 A1* | 1/2011 | Kim | 349/61 |
| 2011/0013376 A1* | 1/2011 | Kim et al. | 362/97.1 |
| 2011/0194034 A1* | 8/2011 | Shimizu | G02B 6/0016 348/739 |
| 2011/0235308 A1* | 9/2011 | Kang | G02B 6/0068 362/97.2 |
| 2013/0021818 A1* | 1/2013 | Baek | G02B 6/0011 362/602 |

FOREIGN PATENT DOCUMENTS

| | | |
|---|---|---|
| CN | 101556403 A | 10/2009 |
| CN | 101889166 A | 11/2010 |

(Continued)

*Primary Examiner* — Sean Gramling
*Assistant Examiner* — Gerald J Suflets, II
(74) *Attorney, Agent, or Firm* — Birch, Stewart, Kolasch & Birch, LLP

(57) ABSTRACT

A backlight unit includes a light guide plate including a first surface and a second surface, opposite to the first surface, having a recess formed toward the first surface, and a light emitting device array disposed in the recess, the light emitting device array including a plurality of light emitting device packages and a board, on which the light emitting device packages are disposed. The light emitting device packages include first light emitting device packages to emit first light in the recess in a first direction, second light emitting device packages to emit second light in the recess in a second direction opposite to the first direction, and third light emitting device packages to emit third light having light output different from at least one of the first light and/or the second light in the recess in a third direction intersecting the first and second directions.

16 Claims, 8 Drawing Sheets

(56) References Cited

FOREIGN PATENT DOCUMENTS

| | | |
|---|---|---|
| CN | 101922660 A | 12/2010 |
| CN | 101956928 A | 1/2011 |
| EP | 2218960 A1 | 8/2010 |
| KR | 10-2009-0073452 A | 7/2009 |
| TW | 200938909 A | 9/2009 |
| WO | WO 2010/058625 A1 | 5/2010 |

* cited by examiner

BACKLIGHT UNIT

CROSS-REFERENCE TO RELATED APPLICATION

This application claims the priority benefit of Korean Patent Application No. 10-2011-0079742, filed on Aug. 10, 2011 in the Korean Intellectual Property Office, the disclosure of which is incorporated herein by reference.

BACKGROUND

1. Field

Embodiments relate to a backlight unit.

2. Description of the Related Art

A light emitting diode (LED) is a device that converts an electrical signal into light using the properties of a compound semiconductor. The LED is used in electric home appliances, remote controllers, electric bulletin boards, displays, various kinds of automated equipment, etc. The application range of LEDs continues to expand.

A backlight unit, to which light emitting diodes are applied, may be used in a display apparatus, such as a liquid crystal display apparatus, and lighting apparatuses for various other fields. Generally, the backlight unit may include a light emitting device package including a light emitting diode, a light guide plate to diffuse light emitted from the light emitting device package, and an optical sheet to diffuse or condense light emitted from the light guide plate.

The light emitting diode included in the light emitting device package of the backlight unit may be driven at low voltage with high efficiency. The light emitting diode is a two-terminal diode device including a compound semiconductor, such as gallium arsenide (GaAs), gallium nitride (GaN) or indium gallium nitride (InGaN). When power is applied to a cathode terminal and an anode terminal of the light emitting diode, the light emitting diode emits light energy generated during recombination between electrons and holes in the form of visible light.

Based on the position of the light emitting device package, the backlight unit is classified as an edge type backlight unit or a direct type backlight unit.

The edge type backlight unit is generally used in relatively small-sized liquid crystal display apparatuses, such as monitors for laptop computers and desktop computers. The edge type backlight unit has the effect of high light uniformity, long lifespan, and reducing the thickness of the liquid crystal display apparatuses.

In recent years, research has been carried out on a backlight unit configured to have not only an edge type structure but also a direct type structure.

SUMMARY

Embodiments provide a backlight unit that uniformly emits light in a central region and edge regions of a light guide plate.

In one embodiment, a backlight unit includes a light guide plate including a first surface and a second surface, opposite to the first surface, having a recess formed toward the first surface, and a light emitting device array disposed in the recess, the light emitting device array comprising a plurality of light emitting device packages and a board, on which the light emitting device packages are disposed, wherein the light emitting device packages include first light emitting device packages to emit first light in the recess in a first direction, second light emitting device packages to emit second light in the recess in a second direction opposite to the first direction, and third light emitting device packages to emit third light having light output different from at least one of the first light and/or the second light in the recess in a third direction intersecting the first and second directions.

In another embodiment, a backlight unit includes a light emitting device array including a plurality of light emitting device packages and a board, on which the light emitting device packages are disposed, and a light guide plate including a first surface and a second surface, opposite to the first surface, having a recess, in which the light emitting device array is disposed, formed toward the first surface, the second surface having a reflective pattern, wherein the light guide plate further includes a first region, located in a first direction of the recess, upon which first light emitted from first light emitting device packages of the light emitting device packages is incident, a second region located in a second direction of the recess, upon which second light emitted from second light emitting device packages of the light emitting device packages is incident, and a third region located in a third direction of the recess, upon which third light, emitted from third light emitting device packages of the light emitting device packages, having light output different from that of the first light and the second light, is incident.

BRIEF DESCRIPTION OF THE DRAWINGS

Details of embodiments will be more clearly understood from the following detailed description taken in conjunction with the accompanying drawings, in which.

DETAILED DESCRIPTION OF EMBODIMENTS

Figure 1:
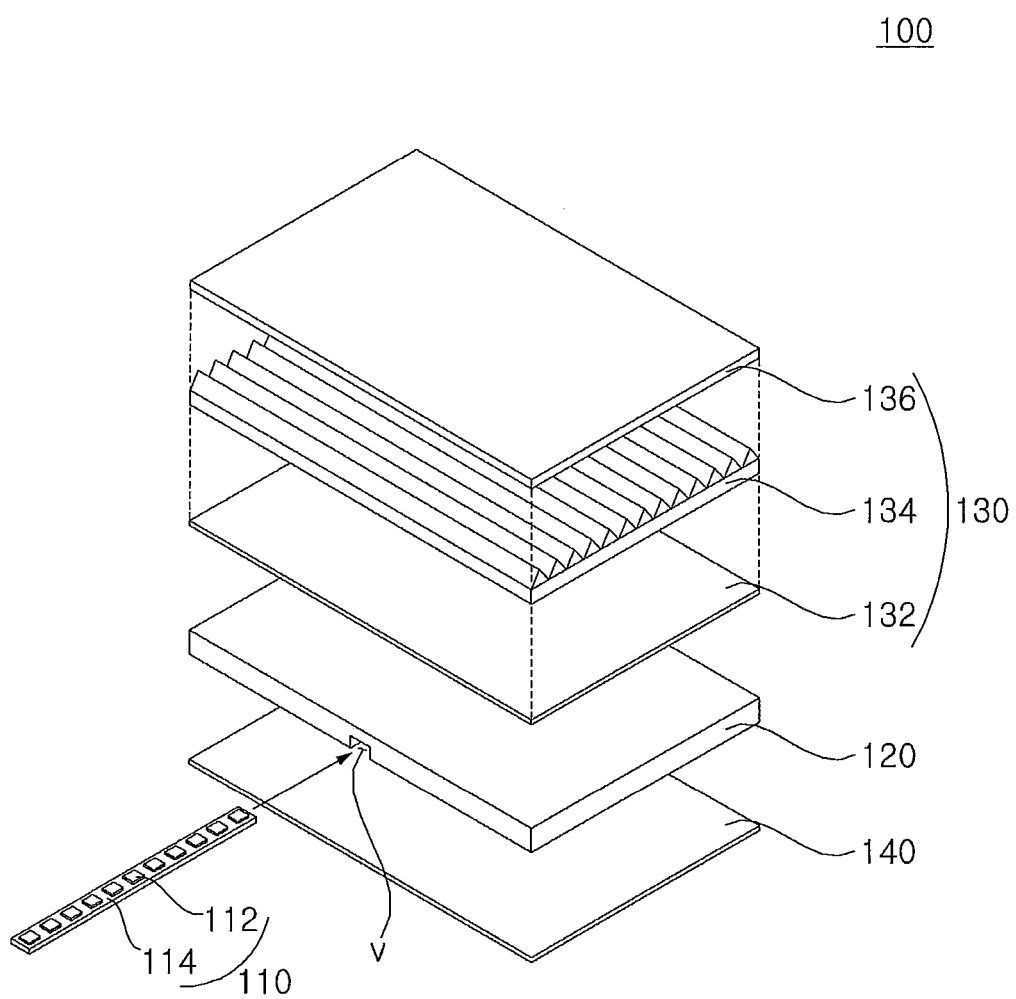
FIG. 1 is an exploded perspective view showing a backlight unit according to a first embodiment.

Reference will now be made in detail to embodiments, examples of which are illustrated in the accompanying drawings. However, the present disclosure may be embodied in many different forms and should not be construed as limited to the embodiments set forth herein. Rather, these embodiments are provided so that this disclosure will be thorough and complete, and will fully convey the scope of the disclosure to those skilled in the art. The present disclosure is defined only by the categories of the claims. In certain embodiments, detailed descriptions of device constructions or processes well known in the art may be omitted to avoid obscuring appreciation of the disclosure by a person of ordinary skill in the art. Wherever possible, the same reference numbers will be used throughout the drawings to refer to the same or like parts.

Spatially-relative terms such as "below", "beneath", "lower", "above", or "upper" may be used herein to describe one element's relationship to another element as illustrated in the Figures. It will be understood that spatially-relative terms are intended to encompass different orientations of the device in addition to the orientation depicted in the Figures. For example, if the device in one of the figures is turned over, elements described as "below" or "beneath" other elements would then be oriented "above" the other elements. The exemplary terms "below" or "beneath" can, therefore, encompass both an orientation of above and below. Since the device may be oriented in another direction, the spatially-relative terms may be interpreted in accordance with the orientation of the device.

The terminology used in the present disclosure is for the purpose of describing particular embodiments only and is not intended to limit the disclosure. As used in the disclosure and the appended claims, the singular forms "a", "an" and "the" are intended to include the plural forms as well, unless context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, the thickness or size of each layer is exaggerated, omitted, or schematically illustrated for convenience of description and clarity. Also, the size or area of each constituent element does not entirely reflect the actual size thereof.

Angles or directions used to describe the structures of light emitting devices according to embodiments are based on those shown in the drawings. Unless there is, in the specification, no definition of a reference point to describe angular positional relations in the structures of the light emitting devices, the associated drawings may be referred to.

FIG. 1 is an exploded perspective view showing a backlight unit 100 according to a first embodiment.

Referring to FIG. 1, the backlight unit 100 may include a light emitting device array 110, a light guide plate 120, and an optical sheet 130.

The light emitting device array 110 may include a plurality of light emitting device packages 112 and a board, on which the light emitting device packages 112 are disposed, which will be described below in detail.

The light guide plate 120 may change point emission light emitted from the light emitting device packages 112 into surface emission light and provide the surface emission light to the optical sheet 130.

That is, the light guide plate 120 may be formed of a polymethylmethacrylate (PMMA) or a transparent acryl resin and may be formed in a flat shape or in a wedge shape. The light guide plate 120 may be formed of glass; however, the disclosure is not limited thereto.

The transparent acryl resin exhibits high strength, and therefore, it is difficult to deform the transparent acryl resin.

Also, the transparent acryl resin is lightweight and exhibits high visible light transmissivity.

The light guide plate 120 exhibits high visible light transmissivity, thereby preventing light from being non-uniformly transmitted through the whole area of the backlight unit 100 and thus preventing the occurrence of a phenomenon in which the edge of the backlight unit 100 is brighter.

Unevenness (not shown) may be formed at the rear of the light guide plate 120 to cause scattered reflection of light. The unevenness may be configured to have a predetermined shape in consideration of the distance from the light emitting device packages 112.

Also, the unevenness may prevent light emitted from the light emitting device packages 112 from being concentrated upon opposite ends of the surface of the light guide plate 120 so that the entirety of the light guide plate 120 can uniformly emit light. A pattern obtained by forming the unevenness may provide surface emission light exhibiting high brightness and uniformity.

The light guide plate 120 may includes a first surface (not shown), on which the optical sheet 130 is disposed, and a second surface (not shown), opposite to the first surface, having a recess (not shown) formed toward the first surface.

In this case, the light guide plate 120 may include a first region (not shown) located in a first direction of the recess, a second region (not shown) located in a second direction of the recess, and a third region (not shown) located in a third direction of the recess.

In the embodiment, a recess v may be formed at the middle of the second surface in the shape of a line. At least one recess may be formed; however, the disclosure is not limited thereto.

That is, the recess v may be formed in a straight shape or in a cross shape to divide the second surface into at least two regions; however, the disclosure is not limited thereto.

The light emitting device array 110 is disposed in the recess v. The light emitting device packages 112 may include side view type light emitting device packages (not shown) and top view type light emitting device packages (not shown), which will be described below in detail.

The optical sheet 130 may include a diffusion film 132, containing diffusion particles, such as beads, to diffuse light emitted from the light guide plate 120 toward a liquid crystal display panel (not shown), a prism film 134 having a prism pattern formed on the diffusion film 132 to concentrate light, and a protective film 136 stacked on the prism film 134 to protect the prism film 134.

The optical sheet 130 may diffuse and condense light emitted from the light emitting device packages 112 and guided by the light guide plate 120 to secure brightness and a viewing angle.

The diffusion film 132 may diffuse and condense light emitted from the light emitting device packages 112 or light returning from the prism film 134 to achieve uniform brightness.

The diffusion film 132 may be formed in the shape of a thin sheet and may be formed of a transparent resin. For example, a film formed of polycarbonate or polyester may be coated with a light diffusion and condensing resin to form the diffusion film 132.

The prism film 134 has a prism pattern vertically or horizontally formed at the surface of an optical film. The prism film 124 condenses light emitted from the diffusion film 132.

The prism pattern of the prism film 134 may be formed in a triangular shape in section to improve light condensing efficiency. A right prism having a vertical angle of 90 degrees may provide excellent brightness.

The protective film 136 may be stacked on the prism film 134 to protect the prism film 134.

A reflective sheet 140 may be formed on the second surface of the light guide plate 120; however, the disclosure is not limited thereto. The reflective sheet 140 may upwardly reflect light emitted from the light emitting device packages 112 toward the light guide plate 120 to improve light transfer efficiency.

In the embodiment, a light reflective pattern may be formed at the second surface of the light guide plate 120, and the diffusion film 132 is disposed on the first surface of the light guide plate 120. Alternatively, a diffusion pattern (not shown) may be formed instead of the diffusion film 132; however, the disclosure is not limited thereto.

Figure 2:
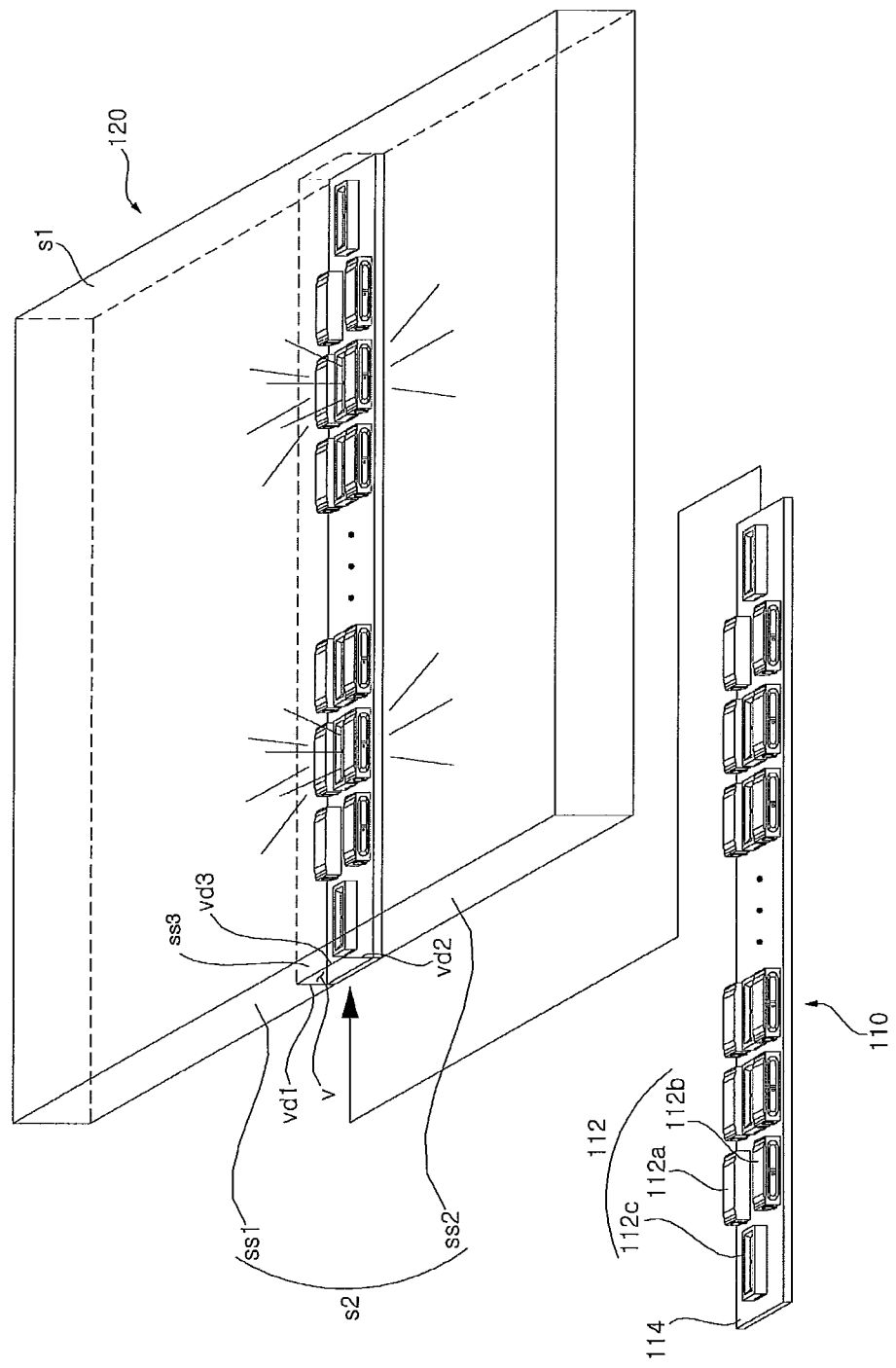
FIGS. 2 and 3 are perspective views showing first and second embodiments of a light emitting device array and a light guide plate shown in FIG. 1.
Figure 3:
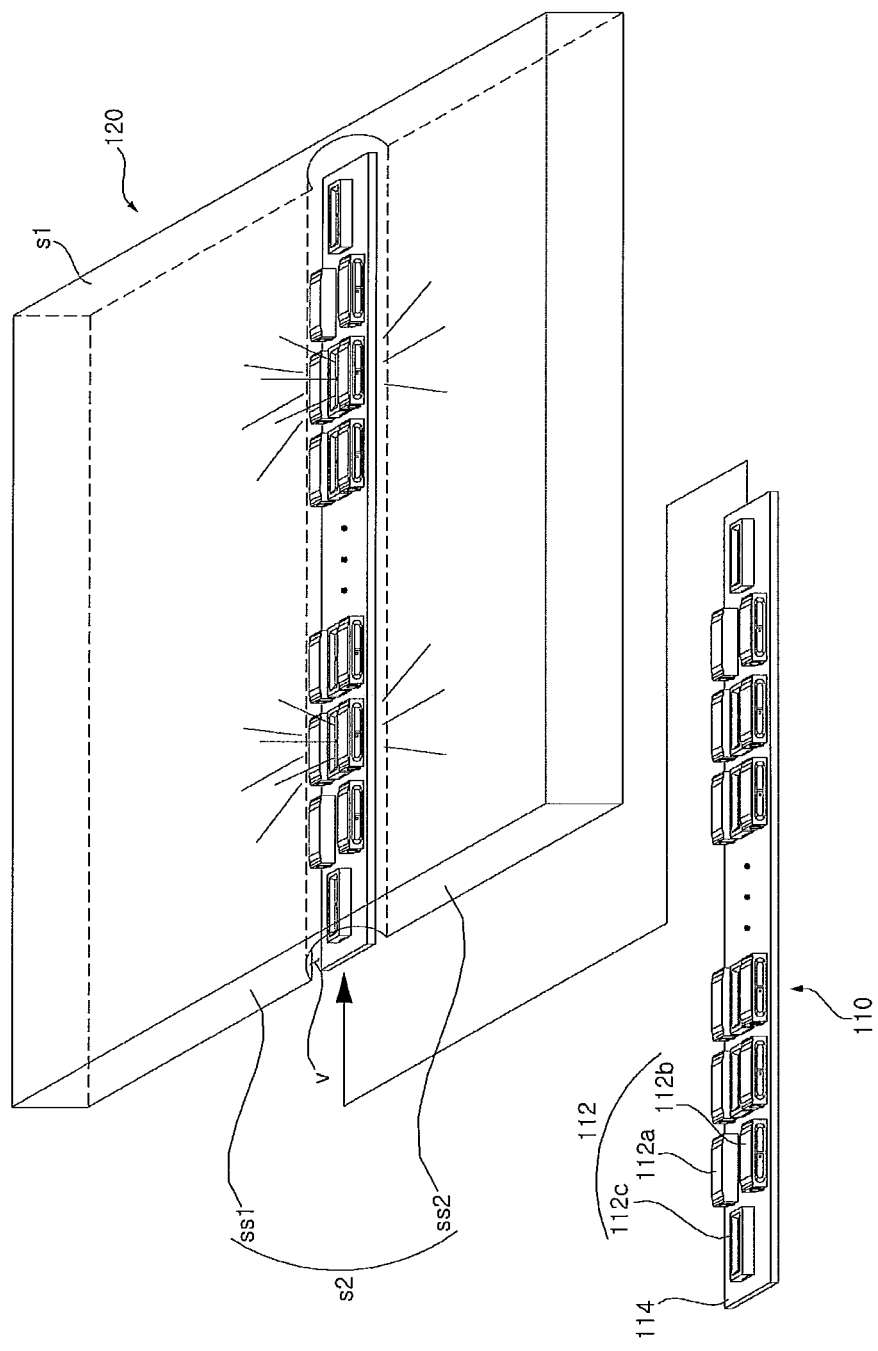
Figure 4:
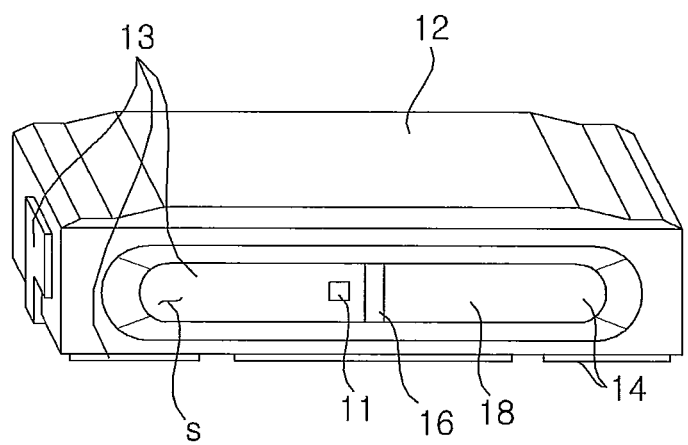
FIG. 4 is a perspective view showing first and second light emitting device packages shown in FIG. 2.
Figure 5:
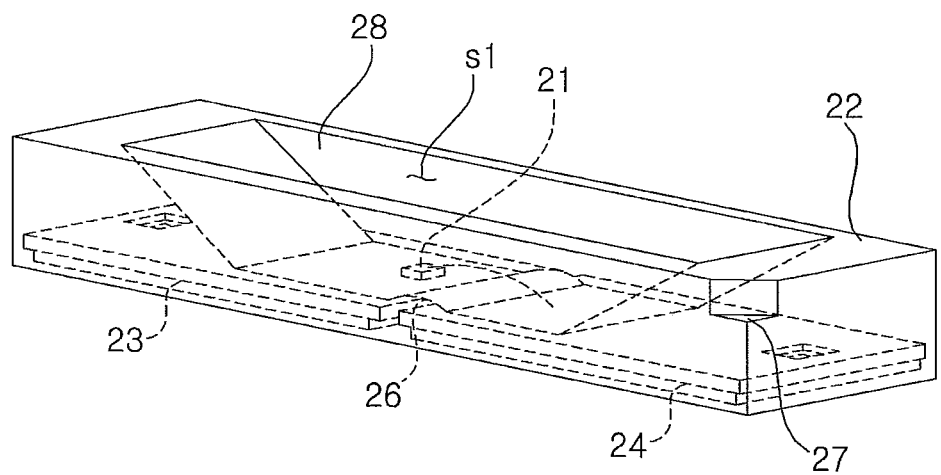
FIG. 5 is a perspective view showing a third light emitting device package shown in FIG. 2.
Figure 6:
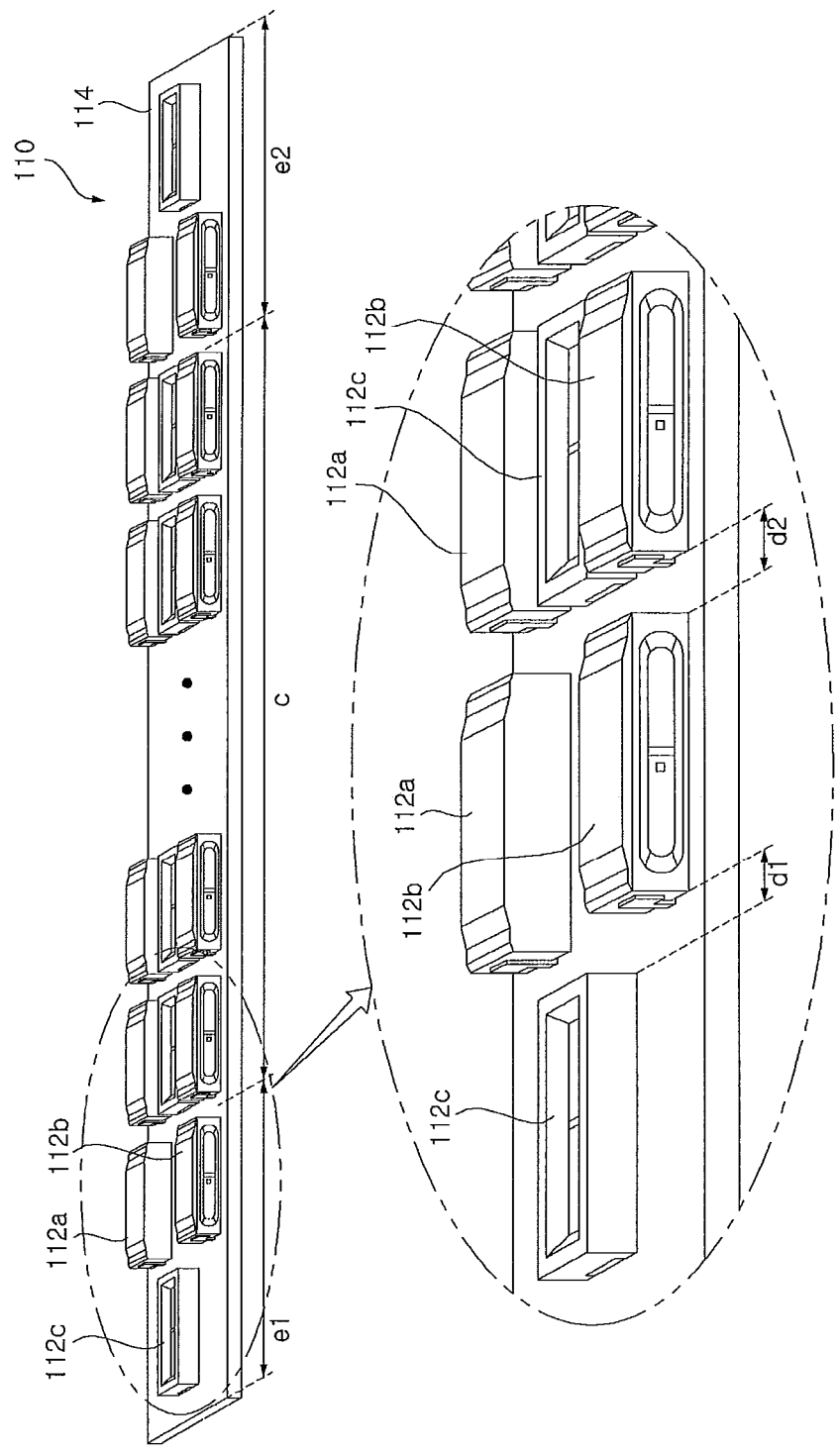
FIG. 6 is a perspective view showing a first embodiment of the light emitting device array shown in FIG. 2.

FIGS. 2 and 3 are perspective views showing first and second embodiments of the light emitting device array and the light guide plate shown in FIG. 1, FIG. 4 is a perspective view showing first and second light emitting device packages shown in FIG. 2, FIG. 5 is a perspective view showing a third light emitting device package shown in FIG. 2, and FIG. 6 is a perspective view showing a first embodiment of the light emitting device array shown in FIG. 2.

Referring to FIGS. 2 to 6, the light emitting device array 110 may be disposed in the recess v of the light guide plate 120.

In this case, the light guide plate 120 may include a first surface s1, on which the optical sheet 130 is disposed, and a second surface s2, opposite to the first surface s1, having a recess v.

Also, the light guide plate 120 may include a first region ss1 located in a first direction (not shown) of the recess v, a second region ss2 located in a second direction (not shown) of the recess v, and a third region ss3 located in a third direction (not shown) of the recess v.

That is, the first region ss1 may be located in a first lateral surface vd1 of the recess v, the second region ss2 may be located in a second lateral surface vd2 of the recess and the third region ss3 may be located in a third surface vd3 of the recess v.

The first and second regions ss1 and ss2 may have a thickness of 1 mm to 2 mm, and the third region ss3 may have a thickness of 0.45 mm to 0.75 mm.

That is, in the light guide plate 120, at least one of the thicknesses of the first, second and third regions ss1, ss2 and ss3 may be different from the remainder of the thicknesses of the first, second and third regions ss1, ss2 and ss3 depending upon the depth of the recess v.

In this case, the thicknesses of the first, second and third regions ss1, ss2 and ss3 may be varied based on the thicknesses of first, second and third light emitting device packages 112a, 112b and 112c; however, the disclosure is not limited thereto.

The recess v may be formed in at least one selected from among a polygonal shape, an edge curved shape and a semicircular shape, and the recess v may be provided at the lower part thereof with a step (not shown) in which a board 114 of the light emitting device array 110 is disposed; however, the disclosure is not limited thereto.

In the embodiment shown in FIG. 2, the recess v is formed in a quadrangular shape in section. In the embodiment shown in FIG. 3, on the other hand, the recess v is formed in a semicircular shape in section.

In this case, the width (not shown) of the recess v may be equal to or less than the width (not shown) of the light emitting device array 110, i.e. the board 114; however, the disclosure is not limited thereto.

That is, the width of the recess v may be set to be equal to or less than that of the light emitting device array 110 to fix the board 114, thereby preventing the light emitting device packages 112 from contacting the third surface vd3 of the recess v.

The depth (not shown) of the recess v may be equal to or greater than the thickness (not shown) of the light emitting device array 110; however, the disclosure is not limited thereto.

That is, the depth of the recess v may be one to three times the height of the light emitting device array 110 or one to three times the height of the light emitting device array 110. For example, the depth of the recess v may be 0.55 mm to 1.25 mm; however, the disclosure is not limited thereto.

In other words, if the depth of the recess v is less than one times the height of the light emitting device packages 112 or less than 0.55 mm, light emitted from the light emitting device packages 112 leaks to under the second surface s2 of the light guide plate 120, i.e. light leakage may occur. On the other hand, if the depth of the recess v is greater than three times the height of the light emitting device packages 112 or greater than 1.25 mm, the thickness of the light guide plate 120 between the first and second surfaces s1 and s2 is increased with the result that it is difficult to obtain a slim light guide plate.

The light emitting device array 110 may include a plurality of light emitting device packages 112 and a board 114, on which the light emitting device packages 112 are disposed.

The board 114 may be a printed circuit board, a flexible printed circuit board or a metal core PCB (MCPCB). A single-sided printed circuit board (PCB), a double-sided printed circuit board (PCB), or a multi-layered printed circuit board (PCB) may be used as the printed circuit board. In the embodiment, the printed circuit board is used as the board 114; however, the disclosure is not limited thereto.

The light emitting device packages 112 may include first, second and third light emitting device packages 112a, 112b and 112c.

The first and second light emitting device packages 112a and 112b may be side view type light emitting device packages and may have the same construction; however, the disclosure is not limited thereto.

The first and second light emitting device packages 112a and 112b shown in FIGS. 2 and 3 have the same construction. FIG. 4 shows the first light emitting device package 112a in detail.

Referring to FIG. 4, a first light emitting device package 112a may include a light emitting device 11 and a package body 12 in which the light emitting device 11 is disposed.

The package body 12 may be formed of at least one selected from among a resin material such as polyphthalamide (PPA), silicon (Si), aluminum (Al), aluminum nitride (AlN), AlOx, liquid crystal polymer, photo sensitive glass (PSG), polyamide 9T (PA9T), syndiotactic polystyrene (SPS), a metallic material, sapphire ($Al_2O_3$), beryllium oxide (BeO), ceramic and a printed circuit board (PCB).

The package body 12 may be formed by injection molding or etching; however, the disclosure is not limited thereto.

The upper surface of the package body 12 may be formed in various shapes, such as a triangular shape, a quadrangular shape, a polygonal shape and a circular shape, based on use or design of the light emitting device 11; however, the disclosure is not limited thereto.

Also, the package body 12 may have a cavity s, in which the light emitting device 11 is disposed. The cavity s may be formed in a cup shape or a concave container shape in section. The inner side surface of the package body 12 defining the cavity s may be inclined downward.

Also, the cavity s may be formed in various shapes, such as a circular shape, a quadrangular shape, a polygonal shape and an oval shape, in plan; however, the disclosure is not limited thereto.

First and second lead frames 13 and 14 may be disposed at the lower surface of the package body 12. The first and second lead frames 13 and 14 may be formed of at least one selected from among titanium (Ti), copper (Cu), nickel (Ni), gold (Au), chrome (Cr), tantalum (Ta), platinum (Pt), tin (Sn), silver (Ag), phosphorus (P), aluminum (Al), indium (In), palladium (Pd), cobalt (Co), silicon (Si), germanium (Ge), hafnium (Hf), ruthenium (Ru) and iron (Fe) or an alloy thereof.

Also, the first and second lead frames 13 and 14 may be formed to have a single layer structure or a multi layer structure; however, the disclosure is not limited thereto.

The inner side surface of the package body 12 may be formed at a predetermined inclination angle with respect to one of the first and second lead frames 13 and 14. A reflection angle of light emitted from the light emitting device 11 may be varied based on the inclination angle of the inner side surface of the package body 12, thereby adjusting a viewing angle of light emitted outward. If a viewing angle of light decreases, concentration of light emitted from the light emitting device 11 increases. On the other hand, if a viewing angle of light increases, concentration of light emitted from the light emitting device 11 decreases.

The inner side surface of the package body 12 may have a plurality of inclination angles; however, the disclosure is not limited thereto.

The first and second lead frames 13 and 14 may be electrically connected to the light emitting device 11 and connected to an anode (positive electrode) and a cathode (negative electrode) of an external power source (not shown) to supply power to the light emitting device 11.

The light emitting device 11 is mounted on the first lead frame 13. The light emitting device 11 is connected to the first lead frame 13 by die bonding. Also, the light emitting device 11 is connected to the second lead frame 14 by wire bonding using a wire (not shown). As a result, power is supplied to the light emitting device 11 via the first and second lead frames 13 and 14.

The light emitting device 11 may be connected to the first and second lead frames 13 and 14 by wire bonding or die bonding; however, the disclosure is not limited thereto.

Also, a cathode mark (not shown) may be formed at the package body 12. The cathode mark may be used to distinguish between polarities of the light emitting device 11, i.e. polarities of the first and second lead frames 13 and 14. Consequently, the cathode mark may be used to prevent confusion when the first and second lead frames 13 and 14 are electrically connected.

An insulative dam 16 may be formed between the first and second lead frames 13 and 14 to prevent the occurrence of a short circuit between the first and second lead frames 13 and 14.

The light emitting device 11 may be a light emitting diode. For example, the light emitting diode may be a colored light emitting diode to emit red, green, blue or white light or an ultraviolet (UV) light emitting diode to emit UV light; however, the disclosure is not limited thereto. Also, a plurality of light emitting devices 11 may be mounted on the first lead frame 13, and at least one light emitting device 11 may be mounted on the first and second lead frames 13 and 14. However, the number and mounted positions of the light emitting devices 11 are not limited.

In the embodiment, a blue light emitting device to emit blue light is used as the light emitting device 11.

Also, the package body 12 may include a resin member filled in the cavity s. The resin member 18 may be formed to have a double or triple mold structure; however, the disclosure is not limited thereto.

The resin member 18 may be formed in a film shape and may contain a fluorescent substance and/or a light dispersing agent. Alternatively, the resin member 18 may be formed of a light transmitting material which does not contain a fluorescent substance and a light dispersing agent; however, the disclosure is not limited thereto.

That is, if the first light emitting device package 112a emits white light, the fluorescent substance may be a red fluorescent substance and a green fluorescent substance. In this case, the light emitting device 11 may emit blue light.

If the light emitting device 11 emits red or green light, a blue fluorescent substance and a green fluorescent substance or a blue fluorescent substance and a red fluorescent substance may be mixed so that the first light emitting device package 112a can emit white light.

Referring back to FIG. 2, the first light emitting device packages 112a may be disposed adjacent to the first lateral surface vd1 of the recess v to emit first light toward the first region ss1, and the second light emitting device packages 112b may be disposed adjacent to the second lateral surface vd2 of the recess v to emit second light toward the second region ss2.

That is, the first and second light emitting device packages 112a and 112b may emit the first and second lights in first and second directions which are opposite to each other to diffuse light to the first and second regions ss1 and ss2, respectively.

The third light emitting device packages 112c may be top view type light emitting device packages to emit third light having light output different from that of the first light and/or the second light to the third surface vd3 of the recess v.

The third light emitting device packages 112c may emit the third light, which has light output less than that of the first light and the second light, to the third region ss3, which has an area less than that of the first and second regions ss1 and ss2.

In this case, the light guide plate 120 may uniformly diffuse light from the first, second and third regions ss1, ss2 and ss3 to the optical sheet 120 disposed on the first surface s1.

If the area of the first region ss1 is equal to or greater than that of the second region ss2, the first light of the first light emitting device packages 112a may have light output equal to or greater than the second light of the second light emitting device packages 112b. Also, the first light of the first light emitting device packages 112a may have different light outputs depending on the areas of the first region ss1 and the second region ss2; however, the disclosure is not limited thereto.

Referring to FIG. 5, a third light emitting device package 112c may include a light emitting device 21 and a package body 22 in which the light emitting device 21 is disposed.

The package body 22 may include a first partition wall (not shown) disposed in a first direction (not shown) and a second partition wall (not shown) disposed in a second direction intersecting the first direction. The first partition wall and the second partition wall may be integrally formed.

The package body 22 may be formed by injection molding or etching; however, the disclosure is not limited thereto.

The package body 22 may be formed of at least one selected from among a resin material such as polyphthalamide (PPA), silicon (Si), aluminum (Al), aluminum nitride (AlN), AlOx, liquid crystal polymer, photo sensitive glass (PSG), polyamide 9T (PA9T), syndiotactic polystyrene (SPS), a metallic material, sapphire ($Al_2O_3$), beryllium oxide (BeO), ceramic and a printed circuit board (PCB).

The upper surface of the package body 22 may be formed in various shapes, such as a triangular shape, a quadrangular shape, a polygonal shape and a circular shape, based on use or design of the light emitting device 21; however, the disclosure is not limited thereto.

Also, the package body 22 may have a cavity s1, in which the light emitting device 21 is disposed. The cavity s1 may be formed in a cup shape or a concave container shape in section. The inner side surface of the package body 22 defining the cavity s1 may be inclined downward.

Also, the cavity s1 may be formed in various shapes, such as a circular shape, a quadrangular shape, a polygonal shape and a circular shape, in plan; however, the disclosure is not limited thereto.

First and second lead frames 23 and 24 may be disposed at the lower surface of the package body 22. The first and second lead frames 23 and 24 may be formed of at least one selected from among titanium (Ti), copper (Cu), nickel (Ni), gold (Au), chrome (Cr), tantalum (Ta), platinum (Pt), tin (Sn), silver (Ag), phosphorus (P), aluminum (Al), indium (In), palladium (Pd), cobalt (Co), silicon (Si), germanium (Ge), hafnium (Hf), ruthenium (Ru) and iron (Fe) or an alloy thereof.

Also, the first and second lead frames 23 and 24 may be formed to have a single layer structure or a multi layer structure; however, the disclosure is not limited thereto.

The inner side surface of the package body 22 may be formed at a predetermined inclination angle with respect to one of the first and second lead frames 23 and 24. A reflection angle of light emitted from the light emitting device 21 may be varied based on the inclination angle of the inner side surface of the package body 22, thereby adjusting a viewing angle of light emitted outward. If a viewing angle of light decreases, concentration of light emitted from the light emitting device 21 increases. On the other hand, if a viewing angle of light increases, concentration of light emitted from the light emitting device 21 decreases.

The inner side surface of the package body 22 may have a plurality of inclination angles; however, the disclosure is not limited thereto.

The first and second lead frames 23 and 24 may be electrically connected to the light emitting device 21 and connected to an anode (positive electrode) and a cathode (negative electrode) of an external power source (not shown) to supply power to the light emitting device 21.

In the embodiment, the light emitting device 21 is mounted on the first lead frame 23, and the second lead frame 24 is spaced apart from the first lead frame 23. The light emitting device 21 is connected to the first lead frame 23 by die bonding. Also, the light emitting device is connected to the second lead frame 24 by wire bonding using a wire (not shown). As a result, power is supplied to the light emitting device 21 via the first and second lead frames 23 and 24.

The light emitting device 21 may be bonded to the first and second lead frames 23 and 24 with different polarities.

Also, the light emitting device 21 may be connected to the first and second lead frames 23 and 24 by wire bonding or die bonding; however, the connection method is not limited thereto.

In the embodiment, the light emitting device 21 is disposed on the first second lead frame 23; however, the disclosure is not limited thereto.

Also, the light emitting device 21 may be joined to the first second lead frame 23 by an adhesive member (not shown).

An insulative dam 26 may be formed between the first and second lead frames 23 and 24 to prevent the occurrence of a short circuit between the first and second lead frames 23 and 24.

In the embodiment, the upper part of the insulative dam 26 may be formed in a semicircular shape; however, the disclosure is not limited thereto.

A cathode mark 17 may be formed at the package body 22. The cathode mark 17 may be used to distinguish between polarities of the light emitting device 21, i.e. polarities of the first and second lead frames 23 and 24. Consequently, the cathode mark 17 may be used to prevent confusion when the first and second lead frames 23 and 24 are electrically connected.

The light emitting device 21 may be a light emitting diode. For example, the light emitting diode may be a colored light emitting diode to emit red, green, blue or white light or an ultraviolet (UV) light emitting diode to emit UV light; however, the disclosure is not limited thereto. Also, a plurality of light emitting devices 21 may be mounted on the first lead frame 23, and at least one light emitting device 21 may be mounted on the first and second lead frames 23 and 24. However, the number and mounted positions of the light emitting devices 21 are not limited.

Also, the package body 22 may include a resin member filling the cavity s1. The resin member 28 may be formed to have a double or triple mold structure; however, the disclosure is not limited thereto.

The resin member 28 may be formed in a film shape and may contain a fluorescent substance and/or a light dispersing agent. Alternatively, the resin member 28 may be formed of a light transmitting material which does not contain a fluorescent substance and a light dispersing agent; however, the disclosure is not limited thereto.

Referring to FIG. 6, the light emitting device array 110 may include first, second and third light emitting device packages 112a, 112b and 112c and a board 114, on which the first, second and third light emitting device packages 112a, 112b and 112c are disposed.

The board 114 may include a central region c and first and second edge regions e1 and e2 adjacent to first and second sides (not shown) of the board 114 in a state in which the central region c is disposed between the first and second edge regions e1 and e2.

In the first and second edge regions e1 and e2, the first, second and third light emitting device packages 112a, 112b and 112c may be disposed on the board 114 in a first pattern. In the central region c, the first, second and third light emitting device packages 112a, 112b and 112c may be disposed on the board 114 in a second pattern.

In the first pattern, the first, second and third light emitting device packages 112a, 112b and 112c may be disposed in a triangular shape, and the third light emitting device packages 112c may be disposed adjacent to the first and second sides of the board 114.

That is, the third light emitting device packages 112c may be disposed adjacent to the first and second sides of the board 114 so that light is dispersed toward the first surface s1 in addition to the first and second edge regions ss1 and ss2, thereby preventing the occurrence of a dark region.

The third light emitting device packages 112c may be spaced apart from extension lines of the first and second light emitting device packages 112a and 112b by a first distance d1.

In the embodiment, the first distance d1 may be a straight distance between each of the third light emitting device packages 112c and one side of a corresponding one of the second light emitting device packages 112b. Alternatively, the third light emitting device packages 112c may be spaced apart from the first and second light emitting device packages 112a and 112b in a diagonal direction.

In the second pattern, the first, second and third light emitting device packages 112a, 112b and 112c may be disposed in line, and each of the third light emitting device packages 112c may be disposed between a corresponding one of the first light emitting device packages 112a and a corresponding one of the second light emitting device packages 112b.

In this case, each of the third light emitting device packages 112c may be spaced apart from a corresponding one of the first light emitting device packages 112a and a corresponding one of the second light emitting device packages 112b by a second distance d2.

In the embodiment, the second distance d2 may be a straight distance between each of the third light emitting device packages 112c and one side of a corresponding one of the first light emitting device packages 112a.

In this case, the distance between each of the third light emitting device packages 112c, disposed in the second pattern, adjacent to the first and second edge regions e1 and e2 and a corresponding one of the first light emitting device packages 112a or the second light emitting device packages 112b disposed in the first pattern may be the first distance d1; however, the disclosure is not limited thereto.

If the areas of the first and second regions ss1 and ss2 shown in FIG. 2 are equal to each other, the first and second light emitting device packages 112a and 112b may have the same package size. On the other hand, if the area of the first region ss1 is less than that of the second region ss2, the package size of each of the first light emitting device packages 112a may be less than that of each of the second light emitting device packages 112b.

Also, luminous intensity of each of the first light emitting device packages 112a may be equal to or less than that of each of the second light emitting device packages 112b. The luminous intensities of the first light emitting device packages 112a and the second light emitting device packages 112b may be set based on the areas of the first and second regions ss1 and ss2; however, the disclosure is not limited thereto.

The first and second light emitting device packages 112a and 112b disposed on the board 114 may be connected to each other in parallel, and the first and second light emitting device packages 112a and 112b may be connected to the third light emitting device packages 112c in series; however, the disclosure is not limited thereto.

Also, the first and second light emitting device packages 112a and 112b may be symmetrically disposed in a state in which the third light emitting device packages 112c are disposed respectively between the first and second light emitting device packages 112a and 112b.

At least one of the first, second and third light emitting device packages 112a, 112b and 112c may emit at least one selected from among white light W, red light R, green light G, blue light B and yellow light Y; however, the disclosure is not limited thereto.

Figure 7:
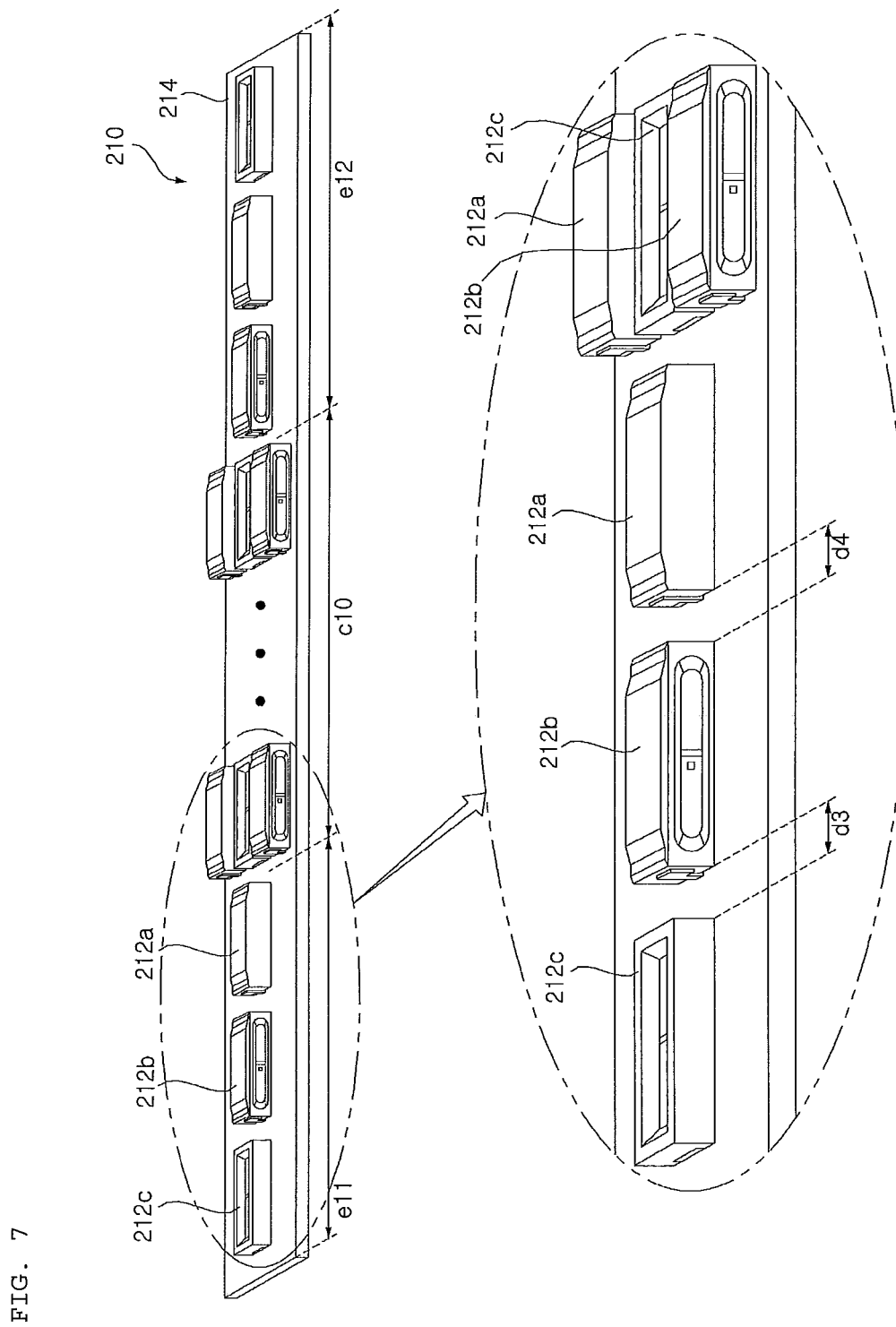
FIGS. 7 and 8 are perspective views showing second and third embodiments of the light emitting device array shown in FIG. 2, respectively.
Figure 8:
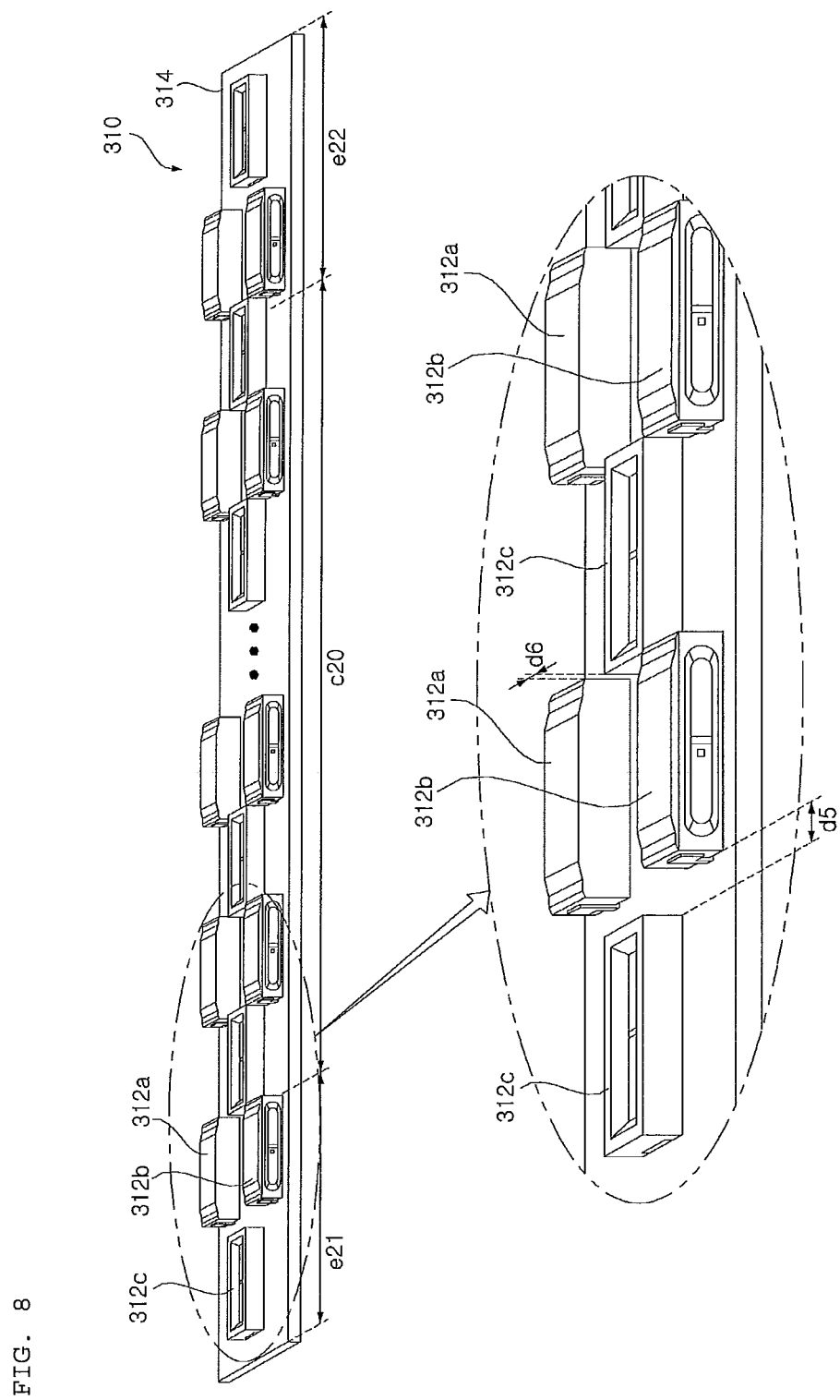

FIGS. 7 and 8 are perspective views showing second and third embodiments of the light emitting device array shown in FIG. 2, respectively.

Components of light emitting device arrays shown in FIGS. 7 and 8 identical to those of the light emitting device array shown in FIG. 6 will not be described or will be briefly described.

Referring to FIG. 7, a light emitting device array 210 may include a central region c10 and first and second edge regions e11 and e12 adjacent to first and second sides of a board 214 in a state in which the central region c10 is disposed between the first and second edge regions e11 and e12.

In the first and second edge regions e11 and e12, first, second and third light emitting device packages 212a, 212b and 212c may be disposed in a first pattern. In the central region c10, the first, second and third light emitting device packages 212a, 212b and 212c may be disposed in a second pattern.

In the embodiment, the second pattern of the central region c10 is identical to that of the central region c shown in FIG. 6, and therefore, a description thereof will be omitted.

In the first pattern, a third light emitting device package 212c may be disposed adjacent to each of the first and second sides of the board 214, and a second light emitting device package 212b and a first light emitting device package 212a may be sequentially disposed adjacent to the third light emitting device package 212c.

In the first and second edge regions e11 and e12, a third distance d3 between the second and third light emitting device package 212b and 212c may be equal to or greater than a fourth distance d4 between the first and second light emitting device package 212a and 212b; however, the disclosure is not limited thereto.

Referring to FIG. 8, a light emitting device array 310 may include a central region c20 and first and second edge regions e21 and e22 adjacent to first and second sides of a board 314 in a state in which the central region c20 is disposed between the first and second edge regions e21 and e22.

In the first and second edge regions e21 and e22, first, second and third light emitting device packages 312a, 312b and 312c may be disposed in a first pattern. In the central region c20, the first, second and third light emitting device packages 312a, 312b and 312c may be disposed in a second pattern.

In the embodiment, the first pattern of the first and second edge regions e21 and e22 is identical to that of the first and second edge regions e1 and e2 shown in FIG. 6, and therefore, a description thereof will be omitted.

The first pattern may be identical to the second pattern; however, the distances among the first, second and third light emitting device packages 312a, 312b and 312c according to the first pattern may be different from those among the first, second and third light emitting device packages 312a, 312b and 312c in the second pattern.

That is, in the central region c20, the first, second and third light emitting device packages 312a, 312b and 312c may be disposed so as to much more improve concentration of light than in the first and second edge regions e21 and e22.

In other words, a fifth distance d5 between each of the third light emitting device packages 312c and a corresponding one of the first light emitting device packages 312a or a corresponding one of the second light emitting device packages 312b in the first and second edge regions e21 and e22 is set to be greater than a sixth distance d6 between each of the third light emitting device packages 312c adjacent to the first and second edge regions e21 and e22 and a corresponding one of the first light emitting device packages 312a or a corresponding one of the second light emitting device packages 312b in the central region c20, thereby improving concentration of light in the central region c20.

Figure 9:
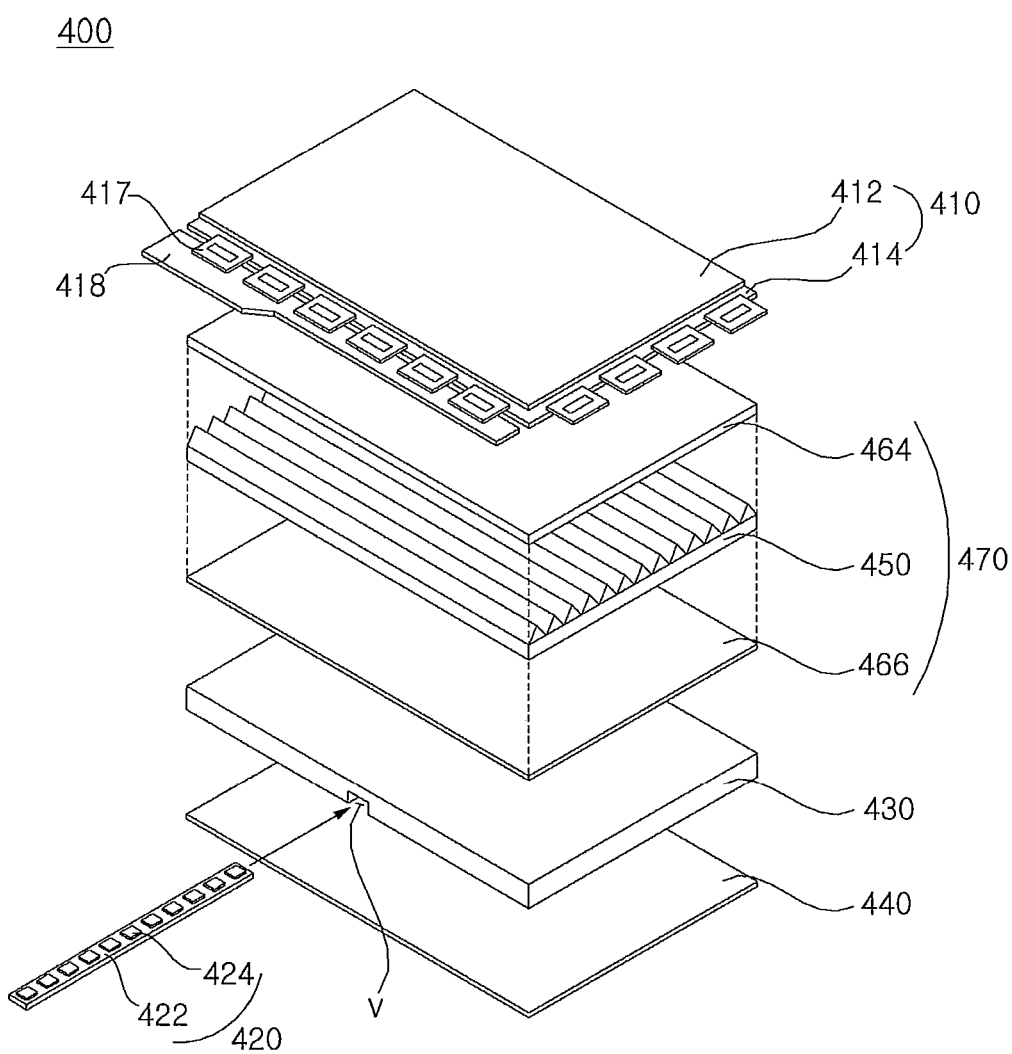
FIG. 9 is an exploded perspective view showing a liquid crystal display apparatus including a backlight unit according to an embodiment.

FIG. 9 is an exploded perspective view showing a liquid crystal display apparatus 400 including a backlight unit according to an embodiment.

Referring to FIG. 9, the liquid crystal display apparatus 400 may include a liquid crystal display panel 410 and a backlight unit 470 to supply light to the liquid crystal display panel 410.

The liquid crystal display panel 410 may display an image using light emitted from the backlight unit 470. The liquid crystal display panel 410 may include a color filter substrate 412 and a thin film transistor substrate 414 disposed opposite to each other in a state in which a liquid crystal is disposed between the color filter substrate 412 and the thin film transistor substrate 414.

The color filter substrate 412 may realize colors of the image displayed through the liquid crystal display panel 410.

The thin film transistor substrate 414 is electrically connected to a printed circuit board 418, on which a plurality of circuit parts is mounted, via drive films 417. The thin film transistor substrate 414 may apply drive voltage supplied from the printed circuit board 418 to the liquid crystal in response to a drive signal provided by the printed circuit board 418.

The thin film transistor substrate 414 may include a thin film transistor and a pixel electrode formed on another transparent substrate, such as a glass or plastic substrate.

The backlight unit 470 includes a light emitting device array 420 to emit light, a light guide plate 430 to change the light emitted from the light emitting device array 420 into surface emission light and to provide the surface emission light to the liquid crystal display panel 410, a plurality of films 450, 466 and 466 to uniformalize brightness distribution of the light provided from the light guide plate 430, thereby improving vertical incidence of light, and a reflective sheet 440 to reflect light emitted to the rear of the light guide plate 430 toward the light guide plate 430.

The light emitting device array 420 may include a plurality of light emitting device packages 424 and a PCB 422 on which the light emitting device packages 424 are mounted to constitute the light emitting device array 420.

Meanwhile, the backlight unit 470 may further include a diffusion film 466 to diffuse the light emitted from the light guide plate 430 toward the liquid crystal display panel 410 and a prism film 450 to condense the diffused light, thereby improving vertical incidence of light. Also, the backlight unit 470 may further include a protective film 464 to protect the prism film 450.

As is apparent from the above description, the backlight unit according to each of the embodiments is configured so that a groove is formed at the rear of a light guide plate, and side view type light emitting device packages to emit light to opposite lateral surfaces of the groove and top view type light emitting device packages to emit light to the upper surface of the groove are disposed in the groove, thereby uniformly emitting light in a central region and edge regions of the light guide plate.

Also, the backlight unit according to each of the embodiments is configured so that light emitting device packages and a board, on which the light emitting device packages are disposed, are disposed in the light guide plate, thereby reducing the area of the backlight unit.

Particular features, structures, or characteristics described in connection with the embodiment are included in at least one embodiment of the present disclosure and not necessarily in all embodiments. Furthermore, the particular features, structures, or characteristics of any specific embodiment of the present disclosure may be combined in any suitable manner with one or more other embodiments or may be changed by those skilled in the art to which the embodiments pertain. Therefore, it is to be understood that contents associated with such combination or change fall within the spirit and scope of the present disclosure.

Although embodiments have been described with reference to a number of illustrative embodiments thereof, it should be understood that numerous other modifications and applications may be devised by those skilled in the art that will fall within the intrinsic aspects of the embodiments. More particularly, various variations and modifications are possible in concrete constituent elements of the embodiments. In addition, it is to be understood that differences relevant to the variations and modifications fall within the spirit and scope of the present disclosure defined in the appended claims.

What is claimed is:

1. A backlight unit comprising:
 a light guide plate comprising a first surface and a second surface, opposite to the first surface, having one linear recess formed toward the first surface; and
 a light emitting device array disposed in the one recess, the light emitting device array comprising a plurality of light emitting device packages and a board, on which the light emitting device packages are disposed,
 wherein the light emitting device packages comprise:
 first light emitting device packages to emit first light in the one recess in a first direction;
 second light emitting device packages to emit second light in the one recess in a second direction opposite to the first direction; and
 third light emitting device packages to emit third light having light output different from at least one of the first light and the second light in the one recess in a third direction intersecting the first and second directions,
 wherein the first light emitting device packages are disposed to emit the first light toward a first region, the second light emitting device packages are disposed to emit the second light toward a second region, and the third light emitting device packages emit the third light to a third region,
 wherein the third region is disposed between the first region and the second region,
 wherein the first, second and third light emitting device packages are disposed respectively in the one recess,
 wherein the first and second light emitting device packages are side view type light emitting device packages,
 wherein the third region vertically overlaps with the one recess,
 wherein the third region is disposed in a center portion of the light guide plate,
 wherein the board comprises first and second edge regions in which the light emitting device packages are disposed in a first pattern and a central region, located between the first and second edge regions, in which the first to third light emitting device packages are disposed in a second pattern, and wherein the first to third light emitting device packages are disposed to form a triangular shape in the first and second patterns, and the first and second patterns have different sizes.

2. The backlight unit according to claim 1, wherein the first light emitting device packages and the second light emitting device packages are symmetrically disposed with respect to a center of the board in a lateral direction or in a longitudinal direction.

3. The backlight unit according to claim 1, wherein the third light emitting device packages are disposed respectively between the first light emitting device packages and the second light emitting device packages.

4. The backlight unit according to claim 1, wherein the third light emitting device packages are connected in parallel to the first light emitting device packages or the second light emitting device packages on the board.

5. The backlight unit according to claim 1, wherein
the third light emitting device packages are not overlapped with the first light emitting device packages or the second light emitting device packages on the board in the first pattern, and
the third light emitting device packages are partially overlapped with the first light emitting device packages or the second light emitting device packages on the board in the second pattern.

6. The backlight unit according to claim 1, wherein
the first pattern in the first and second edge regions is a pattern in which at least two of the third light emitting device packages constitute an array, and
the second pattern in the central region is a pattern in which the first to third light emitting device packages sequentially constitute arrays.

7. The backlight unit according to claim 1, wherein at least one of the first to third light emitting device packages emits at least one selected from among white light, red light, green light, blue light and yellow light.

8. The backlight unit according to claim 1, wherein the one recess has a depth equivalent to one to three times a height of at least one of the first to third light emitting device packages.

9. The backlight unit according to claim 1, wherein the one recess has a depth of 0.55 mm to 1.25 mm.

10. The backlight unit according to claim 1, further comprising an optical sheet disposed on the light guide plate to condense and diffuse light emitted from the light guide plate.

11. The backlight unit according to claim 1, wherein the first surface has a diffusion pattern to diffuse the first light, the second light and the third light.

12. A backlight unit comprising:
a light emitting device array comprising a plurality of light emitting device packages and a board, on which the light emitting device packages are disposed; and
a light guide plate comprising a first surface and a second surface, opposite to the first surface, having one linear recess, in which the light emitting device array is disposed, formed toward the first surface, the second surface having a reflective pattern, wherein the light guide plate further comprises:
a first region, located in a first direction of the one recess, upon which first light emitted from of the light emitting device packages is incident;
a second region located in a second direction of the one recess, the second direction being different than the first direction, upon which second light emitted from second light emitting device packages of the light emitting device packages is incident; and
a third region located in a third direction of the one recess, upon which third light, emitted from third light emitting device packages of the light emitting device packages, having light output different from that of the first light and the second light, is incident, wherein the third region is disposed in a center portion of the light guide plate,
wherein the third region vertically overlaps with the one recess,
wherein the first, second and third light emitting device packages are disposed respectively in the one recess,
wherein the first and second light emitting device packages are side view type light emitting device packages,
wherein the board comprises first and second edge regions in which the light emitting device packages are disposed in a first pattern and a central region, located between the first and second edge regions, in which the first to third light emitting device packages are disposed in a second pattern, and
wherein the first to third light emitting device packages are disposed to form a triangular shape in the first and second patterns, and the first and second patterns have different sizes.

13. The backlight unit according to claim 12, wherein the first surface has a diffusion pattern to diffuse the first light, the second light and the third light.

14. The backlight unit according to claim 12, further comprising a reflective sheet disposed under the light guide plate to reflect light emitted from the first to third light emitting device packages, wherein the reflective sheet is disposed under the first and second regions.

15. The backlight unit according to claim 12, wherein
the first region has an area equal to or greater than that of the second region, and
the first light has light output equal to or greater than that of the second light.

16. The backlight unit of claim 12, wherein the third region is disposed between the first region and the second region.

* * * * *